Figure 1:
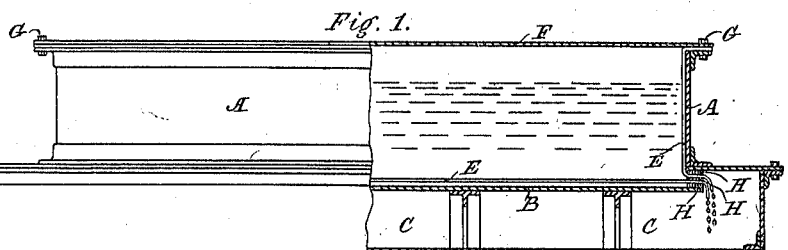

(Model.)

F. A. BONNEFIN.
APPARATUS FOR FILTERING LIQUIDS.

No. 250,418.  Patented Dec. 6, 1881.

5 Sheets—Sheet 1.

Witnesses:
F. de M. Harding
W. R. Vuillen

Inventor:
F. A. Bonnefin

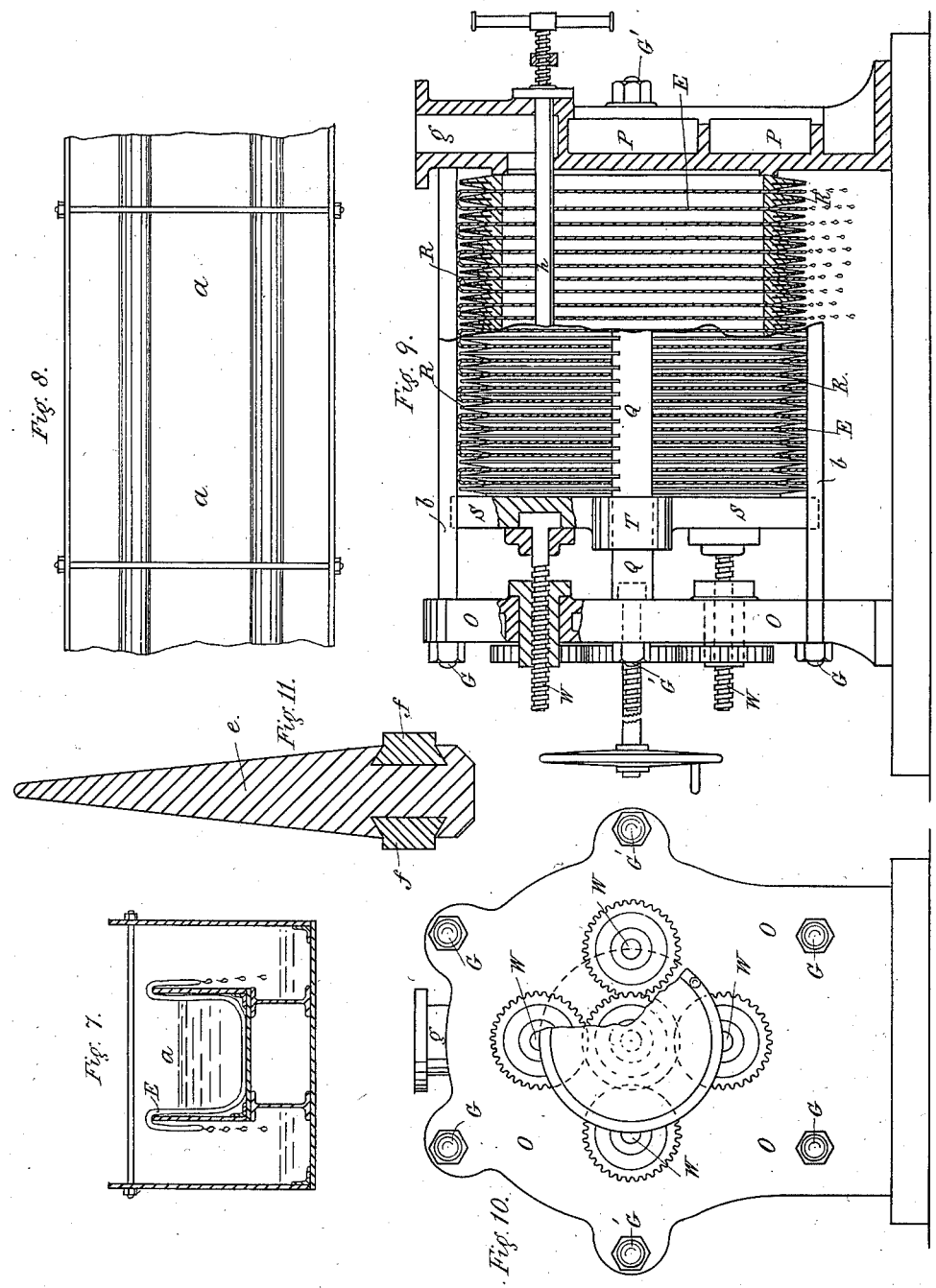

(Model.) 5 Sheets—Sheet 3.

F. A. BONNEFIN.
APPARATUS FOR FILTERING LIQUIDS.

No. 250,418. Patented Dec. 6, 1881.

Witnesses: F. de M. Harding, W. R. Pullen

Inventor: F. A. Bonnefin (Model.)

F. A. BONNEFIN.
APPARATUS FOR FILTERING LIQUIDS.

No. 250,418. Patented Dec. 6, 1881.

5 Sheets—Sheet 4.

Witnesses:

Inventor:

(Model.)

F. A. BONNEFIN.
APPARATUS FOR FILTERING LIQUIDS.

No. 250,418.

5 Sheets—Sheet 5.

Patented Dec. 6, 1881.

Witnesses:

Inventor:

UNITED STATES PATENT OFFICE.

FRANCOIS A. BONNEFIN, OF VACOA, MAURITIUS ISLAND, ASSIGNOR OF ONE-HALF TO BENJAMIN F. STEVENS, OF LONDON, ENGLAND.

APPARATUS FOR FILTERING LIQUIDS.

SPECIFICATION forming part of Letters Patent No. 250,418, dated December 6, 1881.

Application filed May 2, 1881. (Model.) Patented in England August 8, 1877.

*To all whom it may concern:*

Be it known that I, FRANCOIS ALCIDE BONNEFIN, a subject of the Queen of Great Britain, residing at Vacoa, Mauritius Island, have invented certain Improvements in Filters, of which the following is a specification.

My invention may be employed for filtering and separating the solid matters from liquids of all kinds; but it is especially adapted for the removal of all foreign matter-suspended in cane, sorghum, maize, beet, or other saccharine juices.

The invention relates to an apparatus wherein the filtering is accomplished by capillary action taking place through or among fibers composing skeins or elastic fabrics clasped and held between surfaces of some soft or yielding material—as india-rubber, cork, and the like. The capillary action may be aided by direct pressure or suction, or both, applied simultaneously, or by centrifugal action.

The apparatus may be constructed in various ways, all operating on the same principle, and all employing for filtering bundles or skeins of fibers, usually, for convenience, woven or matted together, said fibers being held or pressed together, by preference, between elastic surfaces, one or both of which (and by preference both) being of some soft yielding material—as india-rubber, cork, or the like, as before stated. At one end this fibrous material is in contact with mixture of solid and liquid to be filtered, and the capillary force draws the absolutely pure and clear liquid traveling inside or among the fibers, while the solid matters— even the finest—traveling upon the surface of the threads or bundles of fibers are stopped by the soft compressing material between which the fibers are held. The clear liquid thus passes the yielding nip, while the solid matters are left behind.

The filtering medium which I employ, by preference, is a fabric woven expressly for the purpose, with a thick, soft, and loosely-spun warp and weft. The substance from which the material is made may be animal, vegetable, or mineral—as wool, silk, ramee, cotton, earth, flax, or asbestus.

Figure 22:
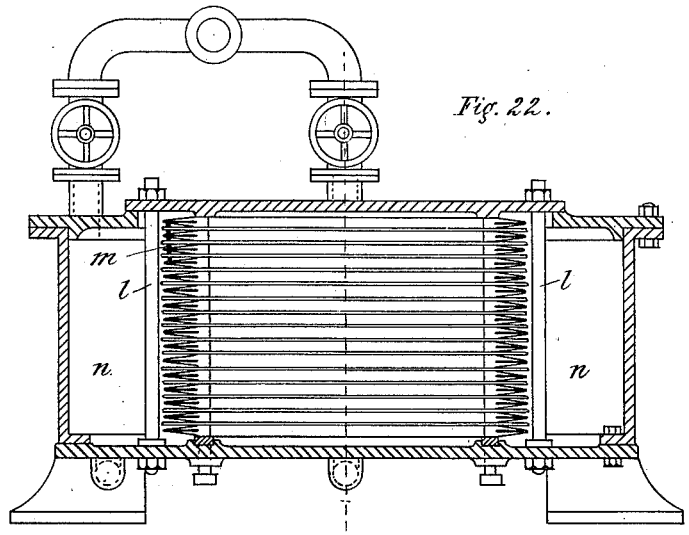
Figure 23:
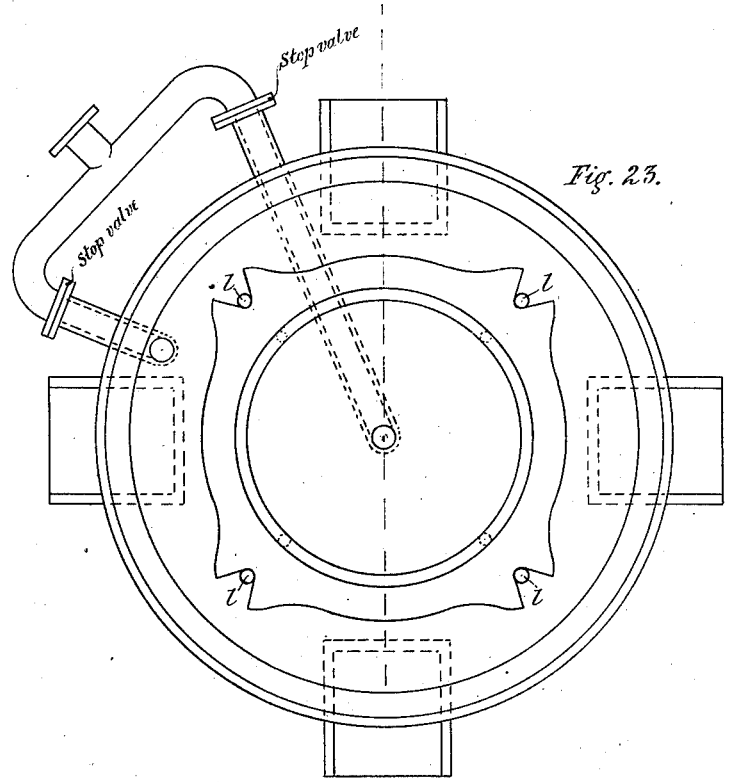
Figure 24:
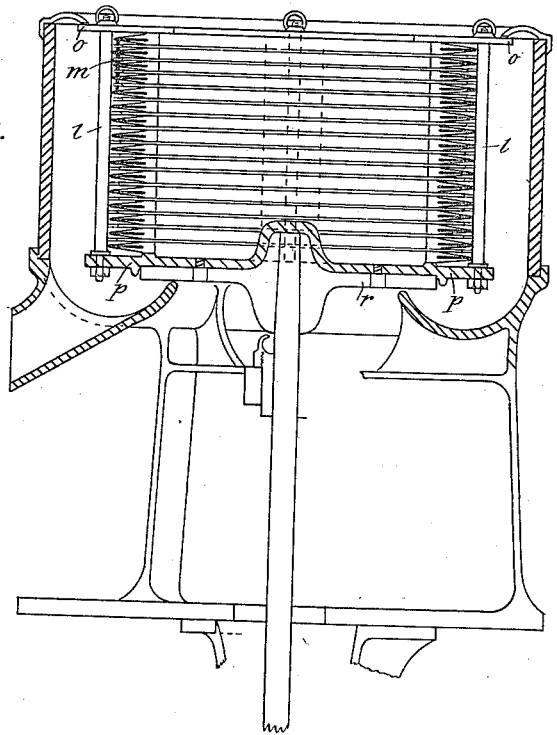
Figure 25:
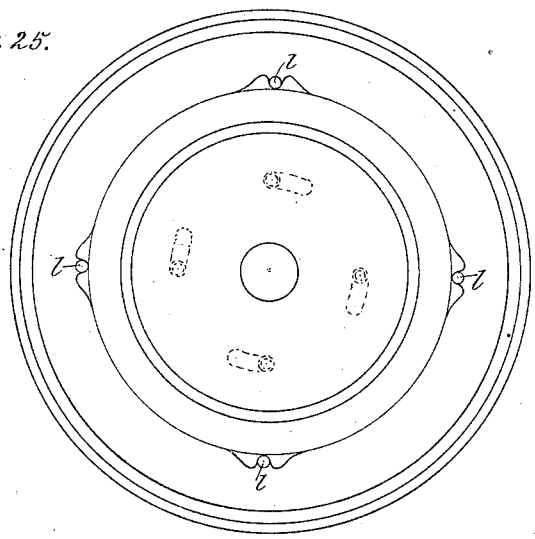

In the drawings, which serve to illustrate my invention, Figures 1 to 6, Sheet 1, illustrate one of the simplest forms of my apparatus, wherein the pressure of the atmosphere may be employed to accelerate the capillary action. Figs. 7 and 8 are, respectively, a cross-section and plan, arranged to illustrate the force of capillarity, as applied to filtration in its simplest and most primitive form. Figs. 9 to 21 illustrate the preferred form of apparatus, wherein the liquid passes through the filtering material arranged on frames. Figs. 22 and 23 illustrate, in vertical section and plan, respectively, a modification of the apparatus shown in Figs. 9 to 21. Figs. 24 and 25, which are also a vertical section and plan, illustrate another modification of the apparatus shown in Figs. 9 to 21, in which centrifugal force is applied to accelerate capillarity.

Referring to Figs. 7 and 8, Sheet 2, *a* is a trough, in which is placed a filtering fabric, E, which hangs over the top or sides of the trough on either side. The liquid to be filtered flows along the trough, capillary action ensues, the pure liquid passes upward and over the sides by the fibers of the filtering material and falls on the outside, while the solid matters remain on the surface of the fabric. The trough may be inclosed in another trough, as shown, or not, as desired.

I will now describe the apparatus shown on Sheet 1, which is next in simplicity to that just described.

Figure 4:
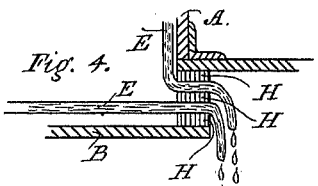
Figure 5:
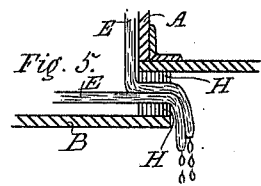

Fig. 1 represents, partly in side elevation and partly in longitudinal section, a filter and a filtering-tank, the sides A A of which are removable and can be lifted off from the bottom B. Below the bottom is arranged a chamber, C, hermetically closed or tight, from which there is an outlet, D. By connecting this outlet with an air-exhausting apparatus a partial vacuum may be produced in the chamber C whenever rapid filtration is desired. The sides and bottom of the receiver or tank are covered with a filtering fabric, (shown in section at E E.) This fabric is secured to the sides by means of clamping-strips F, held down by bolts G, and it extends, together with the fabric which carries the bottom, under the lower edges of the sides A, the two fabrics hanging or projecting into the chamber C. Thus when the sides of the tank are in position on its bottom there are two thicknesses of fabric between the sides and bottom. I also place between the lower edges of the sides, the filtering fabrics, and the bottom, strips of india-rubber or other elastic material, H H. Figs. 4 and 5 are detached sectional views, showing this portion of the filtering apparatus on a larger scale. In Fig. 5, I have omitted the strip H between the fabrics. These yielding strips H conform or adjust themselves to the irregularities of the filtering fabric, making a joint which keeps back all of the solid matters, but leaves the capillaries free to dilate and fill themselves with the pure liquid which passes through. The amount of pressure upon the filtering material may be increased or diminished at will by weighting or counterbalancing the sides.

Figure 2:
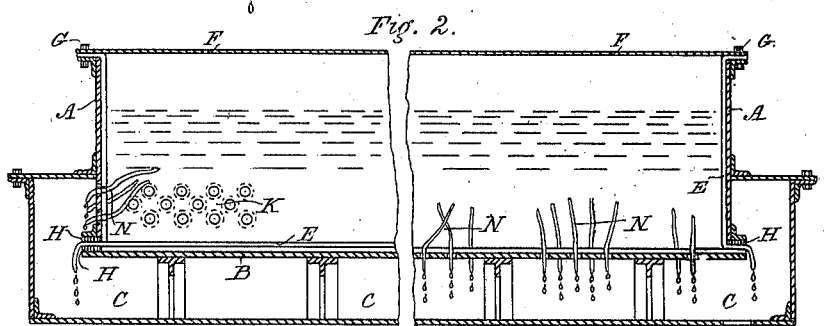
Figure 6:
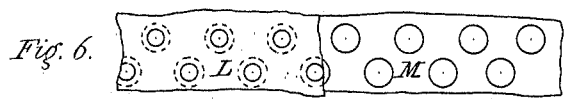
Figure 3:
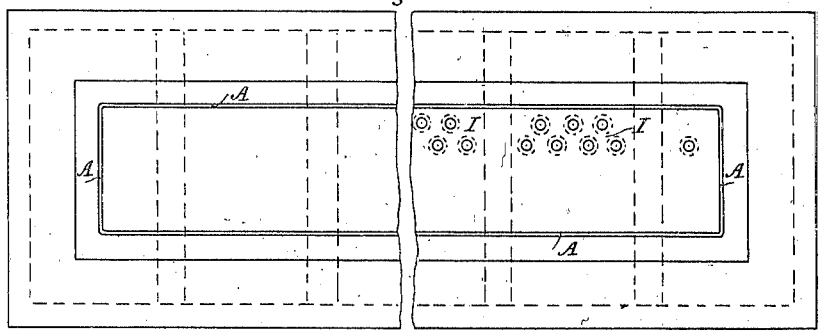
Figure 12:
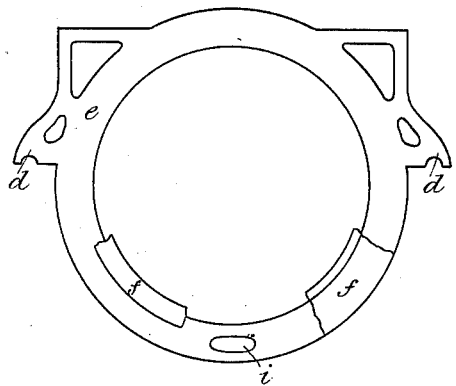
Figure 13:
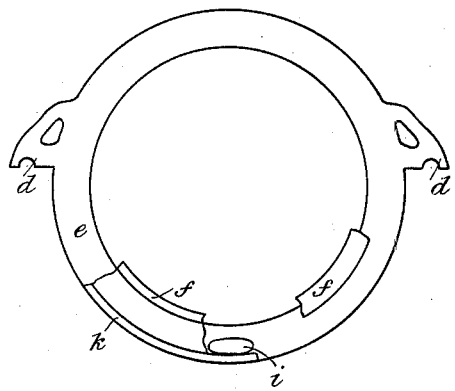

Fig. 2 is a sectional view of a filtering apparatus constructed substantially the same as that just described, but having the tank or receiver set deeper or lower in the vessel C; and Fig. 3 is a plan of the same. These views are intended to illustrate the employment, in addition to the filtering fabric, arranged as last described, or in lieu of it, skeins or bundles N of fibrous filtering material, passed through holes K in the sides and holes I in the bottom of the tank. In this arrangement of the filtering material the side or bottom, as the case may be, has holes M, as shown in the detached and enlarged view, Fig. 6, formed in it, and lesser holes L formed in an internal covering-sheet of india-rubber or similar material. Through the holes in the rubber the skeins or bundles N are tightly drawn, so as to protrude through the holes in the sides and bottom and hang in chamber C.

I will now describe the preferred form of my filter, which is illustrated in Figs. 9 to 21. This may be described, broadly, as a series of rings or frames over which the filtering fabrics are drawn or spread, and the whole set pressed together, so as to clamp or nip the fabrics between yielding surfaces extending all around the lateral faces of the rings or frames.

Fig. 9 is partly a longitudinal mid-section and partly a side elevation of the filter, and Fig. 10 is an end elevation of the same. Fig. 11 is an enlarged cross-section through the rim e of one of the frames, showing the yielding faces f f, between which the filtering fabric is clamped or nipped when the frames are pressed together. Figs. 12, 13, 14, and 15 show various forms of the rings or frames. Figs. 16 to 21 are sections of the rims e of the frames on a large scale, showing various modes of arranging the rubber or other yielding faces f thereon.

O is a front frame, and P is a rear frame. These are mounted on and fixed rigidly to a base piece or plate, and are connected together by means of tie-rods b, provided with nuts G. Q Q are lateral guiding bars or supports, which extend from O to P, and are secured in place by means of nuts G'. On these guiding and supporting bars are mounted a number of frames, R R, provided with lugs or hooked projections d d, which take over and rest upon the bars Q. Any number of frames may be employed consistent with the space within the frame.

S is a follower mounted on the bars Q, which pass through it at T. This follower may be run down upon the frames R, so as to compress them together by means of screws W W, geared together, as shown in Fig. 10, so as to be rotated in unison in a well-known way.

For convenience I have indicated the rim of the frame R by the letter e, and the rubber faces, with which they are provided, by the letter f.

Referring to Figs. 16 to 21, Sheet 3, various methods of arranging the rubber facings will be seen. It will be noted that the rubber projects somewhat laterally beyond the faces of the rims e, so as to always insure yielding projections, between which the filtering fabric is nipped when the frames are pressed together. The form shown in Fig. 11 is the simplest; but any of the other forms will serve the purpose.

Figures 16, 17, 18:
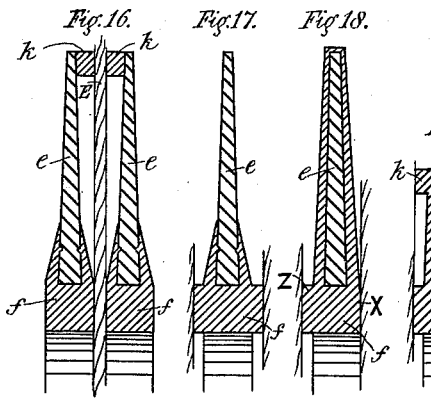

In lieu of making the rubbers f to project on both sides of the rim e, I may make them to project on one face, as at z, in Fig. 18, and smooth on the opposite face, as at x in the same figure.

Figures 19, 20, 21:
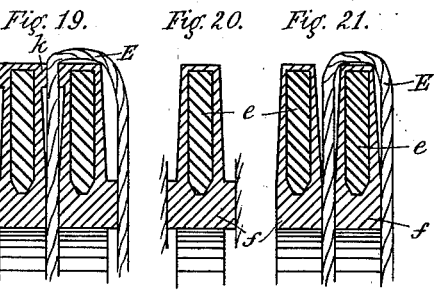
Figure 14:
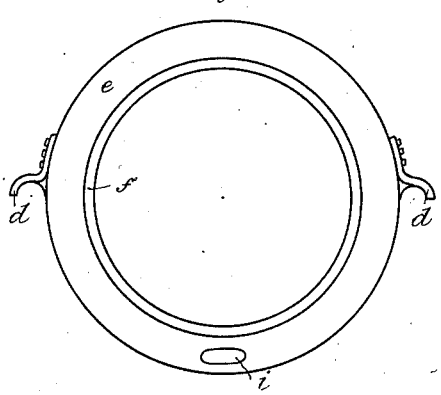
Figure 15:
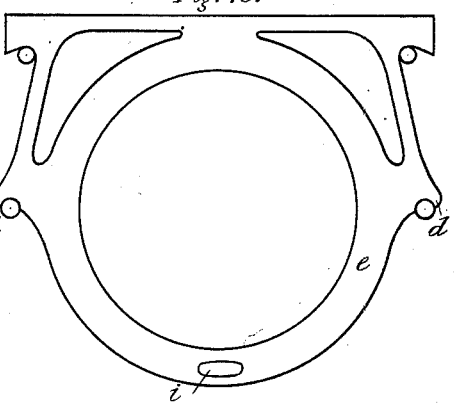

Between each frame R and that next adjacent is placed the filtering fabric E, as shown in Figs. 16, 19, and 21, so as to form partitions between the frames, and cells or chambers between said partitions. These cells, taken together, form a chamber inclosed by the combined rims of the frames R, the follower S, and the back frame, P. The fabric may be either single or double—that is to say, separate pieces may be inserted between the frames, or it may be folded over the rims of the frames, as shown in Figs. 9, 19, and 21.

In the back frame, P, is the inlet g, for the liquid to be filtered, arranged near the top, by preference. The crude liquid admitted at this inlet travels through and fills every chamber or cell by means of holes in the partitions.

A gutter, h, arranged to pass through the partitions, as shown in Fig. 9, may be employed to convey the fluid, for convenience, and every part of the fabric will absorb the fluid part of the mixture, while the solid part will remain on the surface. The pure liquid will travel by capillarity to the periphery of the apparatus, where the solid parts will be stopped by the rubber nips f.

The apparatus can be operated by direct pressure or by suction; but if by the latter method, it must be inclosed in a hermetic casing; or each frame may have a hole, i, Figs. 12 to 15, formed in its rim, and rings k, of rubber, (see Figs. 13, 16, and 19,) be placed between the frames outside of said holes i, so as to form a close joint. The holes i are aligned and form a line pipe or conduit, which may be put into connection with an air-exhausting apparatus and a partial vacuum formed within each inclosed space.

Referring to Figs. 22 and 23, the former is a vertical mid-section of an apparatus very similar to that last described, and the latter a plan of the same. In this construction the frames are piled one upon another and compressed vertically. The guide-rods *l* serve to properly register the frames and, through the medium of a cap-plate, to compress them also. Between adjacent frames are placed blocks or supports *m*, for throwing the weight of all the frames onto the metallic or hard parts of the frames, but permitting the yielding nips *f* to compress the filtering fabric with the required force. In this apparatus the liquid is introduced through an opening in the follower or top plate by means of a pump or other feeding apparatus. The apparatus may be operated by direct pressure, by suction, or by both together, and it may be worked from outside to inside, or from inside to outside.

In Figs. 24 and 25, Sheet 5, I have shown another modification of the preferred form of my apparatus, which is very similar to that last described, except that centrifugal power is employed to accelerate capillarity.

Fig. 24 is a section, and Fig. 25 is a plan, of the apparatus. I employ herein a casing similar to that used in ordinary centrifugal machines, except that the top part is greater in diameter than the movable inside part, as shown at *o o* in Fig. 24. The movable or inside part is commonly called the "basket" or "pannier," and this is constructed as follows: I place upon the rotative disk or plate *r* of the centrifugal machine a plate, *p*, and secure them together. The structure of frames and filtering fabrics is mounted upon the plate *p*, where it is retained by rods *l l*, which connect said plate with a suitable top plate. When the filtering operation is completed I remove the frames singly; or, better still, the entire pannier or basket may be lifted out in one piece and replaced by another pannier already constructed, as above described. This last apparatus does not, of course, require a pump or feeder; but the number of frames that may be employed at one time is comparatively limited, while in my horizontal arrangement of the apparatus almost any number of frames may be employed.

When a filtering operation is completed, (taking cane-juice for an illustration,) I must get the last drop of saccharine liquid that still remains both in the solid foreign matters and the filtering fabrics. For that purpose I employ water, by preference, either cold, tepid, or warm, which is forced into the apparatus by a pump or other means. The water forces out the saccharine liquid, and after this liquid is forced out only the pure water will remain. This is exactly the same effect as osmose, or the diffusion taking place in the cells of plants worked upon.

Having thus described my invention, I claim—

1. A filtering apparatus comprising a fibrous material compressed between elastic or yielding nips, through which compressed material the liquid to be filtered is caused to pass, substantially as set forth.

2. A filtering apparatus comprising a vessel to which the liquid to be filtered is supplied, said vessel having outlets lined with yielding or elastic material and filled with a fibrous material, said fibrous material being nipped and held by the said elastic material, substantially as and for the purposes set forth.

3. An apparatus for filtering liquids, comprising a vessel, to which the liquid to be filtered is supplied, composed of a series of rings or frames having yielding or elastic lateral faces and interposed fibrous filtering fabrics, the whole pressed together, substantially as set forth.

4. An apparatus for filtering liquids, comprising a base on which are fixed the front and back frames, O and P, connected together rigidly by means of rods *b b*, and the latter frame provided with an inlet, *g*, the guiding rods or bars Q, follower S, screws W, rings or frames R, provided with yielding elastic rings *f*, and the filtering fabrics E, all arranged to operate substantially as and for the purposes set forth.

F. A. BONNEFIN.

Witnesses:
    F. DE M. HARDING,
        27 *Leadenhall Street, London.*
    W. R. PULLEN,
        504 *Oxford Street, W. C., London.*